United States Patent
Zhou

(10) Patent No.: US 10,428,994 B2
(45) Date of Patent: Oct. 1, 2019

(54) AUTO-FILL TWO-LAYER TWO-HALF WEAR RESISTANT ELBOW OF CONCRETE PUMP TRUCK AND MANUFACTURING METHOD THEREOF

(71) Applicant: Zhaohui Zhou, Changsha (CN)

(72) Inventor: Zhaohui Zhou, Changsha (CN)

( * ) Notice: Subject to any disclaimer, the term of this patent is extended or adjusted under 35 U.S.C. 154(b) by 0 days.

(21) Appl. No.: 15/523,564

(22) PCT Filed: Jan. 28, 2016

(86) PCT No.: PCT/CN2016/072575
§ 371 (c)(1),
(2) Date: May 1, 2017

(87) PCT Pub. No.: WO2017/024776
PCT Pub. Date: Feb. 16, 2017

(65) Prior Publication Data
US 2017/0314724 A1 Nov. 2, 2017

(30) Foreign Application Priority Data

Aug. 8, 2015 (CN) .......................... 2015 1 0480201
Nov. 3, 2015 (CN) .......................... 2015 1 0736119

(51) Int. Cl.
*F16L 57/06* (2006.01)
*B65G 53/52* (2006.01)
(Continued)

(52) U.S. Cl.
CPC ............. *F16L 57/06* (2013.01); *B65G 53/523* (2013.01); *E04G 21/0436* (2013.01); *F16L 9/19* (2013.01); *F16L 43/00* (2013.01); *F16L 43/001* (2013.01)

(58) Field of Classification Search
CPC ..... F16L 9/08; F16L 9/19; F16L 43/00; F16L 43/001; F16L 57/06; F16L 13/10;
(Continued)

(56) References Cited
U.S. PATENT DOCUMENTS 471,620 A * 3/1892 Noble .................. F16L 43/001
285/183
1,866,672 A * 7/1932 Salmon .................. F16L 21/06
285/125.1
(Continued)

FOREIGN PATENT DOCUMENTS

CN 201531699 U 7/2010
CN 202561281 U 11/2012
(Continued)

OTHER PUBLICATIONS

International Search Report (PCT/ISA/210) issued in PCT/CN2016/072575, dated May 13, 2016.
(Continued)

*Primary Examiner* — Anna M Momper
*Assistant Examiner* — Fannie C Kee
(74) *Attorney, Agent, or Firm* — Birch, Stewart, Kolasch & Birch, LLP

(57) ABSTRACT

An auto-fill two-layer two-half wear resistant elbow of a concrete pump truck consists of an outer-layer protection elbow, an inner-layer heterogeneous wear resistant combined elbow and a wear resistant connecting flange. A filling space is provided between the outer-layer protection elbow and the inner-layer heterogeneous wear resistant combined elbow. The wear resistant elbow is designed as a two-layer two-half unique structure including a protection layer and a wear resistant layer. Upon using the wear resistant elbow for the first time, the concrete grout fills the reserved slit via the heterogenous combined elbow and enters the reserved filling
(Continued)

space, allowing the outer-layer protection elbow and the inner-layer heterogeneous wear resistant combined elbow to be fixed as a whole.

10 Claims, 16 Drawing Sheets

(51) Int. Cl.
  *F16L 43/00* (2006.01)
  *E04G 21/04* (2006.01)
  *F16L 9/19* (2006.01)
(58) Field of Classification Search
  CPC ....... F16L 13/11; F16L 13/113; B65G 53/523; F01N 13/1888
  USPC .. 285/179, 179.2, 182–183, 230, 16–17, 55, 285/294.3, 296.1
  See application file for complete search history.

(56) References Cited

U.S. PATENT DOCUMENTS

| | | | | | |
|---|---|---|---|---|---|
| 3,153,546 | A | * | 10/1964 | Dunn | F16L 59/11 138/149 |
| 3,200,023 | A | * | 8/1965 | Cilker | B29D 1/005 138/109 |
| 4,662,655 | A | * | 5/1987 | Fliervoet | F16L 47/02 285/133.3 |
| 5,186,502 | A | * | 2/1993 | Martin | F16L 39/005 138/112 |
| 5,188,396 | A | * | 2/1993 | Calvin | F16L 57/06 285/148.23 |
| 5,452,922 | A | * | 9/1995 | Ziu | F16L 39/005 285/123.1 |
| 5,718,461 | A | * | 2/1998 | Esser | B65G 53/523 285/179 |
| 6,209,319 | B1 | * | 4/2001 | Maeda | F01N 13/102 138/114 |
| 6,467,812 | B1 | * | 10/2002 | Klemm | E04G 21/04 285/55 |
| 6,520,213 | B1 | | 2/2003 | Esser | |
| 2008/0298908 | A1 | * | 12/2008 | Esser | B65G 53/523 406/191 |
| 2014/0283942 | A1 | | 9/2014 | Ferre et al. | |

FOREIGN PATENT DOCUMENTS

| | | | | |
|---|---|---|---|---|
| CN | 203023710 U | | 6/2013 | |
| CN | 203286190 U | | 11/2013 | |
| CN | 104061394 A | | 9/2014 | |
| CN | 104653934 A | | 5/2015 | |
| CN | 104747849 A | | 7/2015 | |
| CN | 105202299 A | | 12/2015 | |
| DE | 102005051766 A1 | * | 5/2007 | ........... B65G 53/523 |
| EP | 1873440 A1 | * | 1/2008 | ........... B65G 53/523 |
| JP | 59128910 A | * | 7/1984 | ......... F01N 13/1844 |
| KR | 20-0473930 Y1 | | 8/2014 | |
| WO | WO-2012122808 A1 | * | 9/2012 | ........... F16L 43/007 |

OTHER PUBLICATIONS

Office Action issued in Chinese Patent Application No. 201510736119.X, dated Dec. 19, 2016.
Office Action issued in Chinese Patent Application No. 201510736119.X, dated Mar. 8, 2017.
Office Action issued in Chinese Patent Application No. 201510736119.X, dated Oct. 31, 2016.
Office Action issued in Chinese Patent Application No. 201510736119.X, dated Sep. 26, 2016.
Written Opinion (PCT/ISA/237) issued in PCT/CN2016/072575, dated May 13, 2016.

* cited by examiner

AUTO-FILL TWO-LAYER TWO-HALF WEAR RESISTANT ELBOW OF CONCRETE PUMP TRUCK AND MANUFACTURING METHOD THEREOF

RELATED APPLICATION

The present application claims the priority of the China Invention Patent application No. 201510736119.X titled of "Auto-fill two-layer two-half wear resistant elbow of concrete pump truck and manufacturing method thereof" filed on Nov. 3, 2015; and the priority of the China Invention Patent application No. 201510480201.0 titled of "Auto-fill two-layer two-half wear resistant elbow of concrete pump truck and manufacturing method thereof" filed on Aug. 8, 2015.

FIELD OF THE INVENTION

The present invention relates to a conveying connecting elbow structure for conveying fluid state material, particularly to an auto-fill two-layer two-half wear resistant elbow of concrete pump truck and a manufacturing method thereof.

BACKGROUND

Elbow forming technologies mainly include casting and molding technologies, all of which depend on moulds. In the moulds, elbows are conformally formed by casting or hot/cold pressing techniques. Most machinery equipments and pipelines use elbows mainly for conveying various materials. Materials for elbows include cast iron, stainless steel, alloy steel, malleable cast iron, carbon steel, non-ferrous metal and plastic materials. In building, mine, metallurgy, electric power, petroleum, coal, grain processing industries, materials are conveyed by line pressure and pipelines are subject to large pressure and severe wearing. Therefore, high overall performance requirements have been imposed on conveying pipes, in particular connecting elbows and increasing service life of elbows has become a difficulty to overcome.

Single-layer high manganese steel elbows are most commonly used elbows at present. There are also a few elbows using double layer high chromium cast iron. Single-layer high manganese steel elbows suffer poor wear resistant property, low hardness and low safety. Double-layer wear resistant elbows have high costs, better quality, excellent wear resistant property, high hardness and high safety, however their performance-to-price ratio is low. Developing a wear resistant elbow with excellent performance, low cost and good safety is a job to be done urgently in the entire industry. By searching the pipe wearing mechanism and flow mode of materials under different working conditions, simulation is conducted to find out regions that are most likely to be worn and increase the thickness of wear resistant layer or increase wear resistant property of materials in these regions for the purpose of increasing life time of the elbow as a whole, saving costs for customers and saving resources for the society.

At present, in the patent CN 2030237100 disclosed in China, a wear resistant elbow is disclosed which includes a body, and further includes a high molecular elastomer layer disposed in said body with a thickness of 3-15 mm at the middle section of said elbow and 2-10 mm at ends of said elbow. However, the wear resistant elbow suffers increased cost, high probability of being worn between the body and the high molecular elastomer layer, and high probability of peeling the high molecular layer under the washing of fluid.

In the patent CN 203286190U disclosed in China patent document, a wear resistant elbow for conveying concrete is disclosed. Said elbow is a single-layer concrete conveying elbow including an inner all and an outer wall. The arc-shaped inner surface of said outer wall is provided with a recess located on the inner surface of said outer wall at a position with largest curvature and extending towards both sides along the position. A wear resistant layer is incorporated on said recess. However, although this kind of concrete conveying wear resistant elbow includes an inner wall and an outer wall, it is actually a single-layer structure with low safety and the inner wall is formed by providing and filling a recess on the arc-shaped inner surface. In this way, its manufacturing is rather complex, and problems exist in terms of mounting fastness of inner wall and outer wall, and wear resistant effect is poor at locations other than the recess position.

In the patent CN 202561281U disclosed in China patent document, a wear resistant pipe and a wear resistant elbow pipe fitting are disclosed. The wear resistant pipe and the wear resistant elbow pipe fitting include a steel-made pipe body and a wear resistant inner lining layer of ceramic coating being provided on the inner wall of the steel-made pipe body. As an improvement, a metallic wire net is provided in the wear resistant inner lining layer of ceramic coating which is welded on the inner wall of steel-made pipe body. The wear resistant pipe and wear resistant elbow pipe fitting use a wear resistant inner lining layer of ceramic coating at inward curves, and a wear resistant inner lining layer of ceramic coating is also used in regions that does not need high wear-resistance, which results in material waste and increased costs. A metallic wire net is further embedded in the wear resistant inner lining of ceramic coating, which increases manufacturing difficulty although it can reduce drop-out of ceramics in use.

In the patent CN 104061394A disclosed in China patent document, a method for manufacturing curved pipe fittings and curved pipe fittings obtained therefrom are disclosed, including obtaining a first outer curved tubular component and a second inner curved component. Said second inner curved component is made of wear-resistant material larger than the first outer curved tubular component and has a cross section to cover at least partial inner surface of the first outer curved tubular component. The method manufactures the first outer curved tubular component into at least two components, wherein each component has a cross section that is a corresponding part of the entire tubular section of the first outer curved tubular component. The at least two components are made to be close to each other along their respective connecting edges and the second inner curved components are disposed inside and contacts at least one of the two components. The at least two components are welded to form the first outer curved tubular component and said second inner curved component is sealed inside the first outer curved tubular component. If the second inner curved component of the the curved pipe fitting adopts a semi-tube design, there will be significant problems in terms of mounting fastness of the first outer curved tubular component and the second inner curved component, and at the same time, a problem of poor wear-resistance will occur if the second inner curved component is at the extension part. If the second inner curved component adopts a complete tube design, the second inner curved component is of the same material, whereas material used for regions with low wear resistance may be relatively cheap wear resistant material, which results in wasting of material and influence on economy.

SUMMARY

The object of the present invention is to overcome the above-mentioned problems by allowing a double-layer elbow to form one solid by auto fill of concrete and decreasing friction between the double-layer elbow for the purpose of reducing costs, enhancing wear resistance, and increasing service life. The object of the present invention provides a auto-fill two-layer two-half wear resistant elbow of concrete pump truck and a manufacturing method thereof.

The present invention achieves its object with the following technical solution: providing an auto-fill two-layer two-half wear resistant elbow of a concrete pump truck and a manufacturing method thereof, the elbow consisting of an outer-layer protection elbow 1, an inner-layer heterogeneous wear resistant combined elbow 2 and a wear resistant connecting flange 4. Said inner-layer heterogeneous wear resistant combined elbow 2 consists of an inner layer wear resistant large curve part 2-1 and an inner layer wear resistant small curve part 2-2. A filling reinforcement bay 3 is provided between the outer-layer protection elbow and the inner-layer heterogeneous wear resistant combined elbow 2. The inner layer wear resistant large curve part 2-1 and the inner layer wear resistant small curve part 2-2 are of made of different kinds of material and forming inner-layer heterogeneous wear resistant combined elbow with a ring-shaped cross-section.

Upon pumping concrete for the first time, under the action of pressure, due to the different deformation rates between the inner layer wear resistant large curve part 2-1 and the inner layer wear resistant small curve part 2-2 with heterogenous design, the parts where they join each other separate and expand to form a filling channel 2-3 through which the concrete automatically fill the reserved filling reinforcement bay 3. While stopping pumping, the inner layer wear resistant large curve part 2-1 and the inner layer wear resistant small curve part 2-2 resume to close, and solidified concrete in the reserved filling reinforcement bay 3 may achieve the purpose that the outer-layer protection elbow 1 and the inner-layer heterogeneous wear resistant combined elbow 2 combine together completely for reinforcing the elbow.

In the present invention, in order to protect the wear resistant layer on the inner layer of elbow from collision by external force, distortion and damage by striking and distortion or even damaged function by impact force of internal materials during the transportation, installation and use course of elbow, a large curve outer protection elbow 1-1 and a small curve outer protection elbow 1-2 are provided; a large curve outer protection elbow inner surface 1-3 is inside the large curve outer protection elbow 1-1, a small curve outer protection elbow inner surface 1-4 is inside the small curve outer protection elbow 1-2; wherein the cross sections of the large curve outer protection elbow 1-1 and the small curve outer protection elbow 1-2 are circular arcs of any degrees but the combined cross section of two half-tubes may form a closed loop; and the outer-layer protection elbow 1 consists of a plurality of two halves or more components that combine to have a cross section that may form a closed loop.

In order to enhance wear resistance of the locations that are most likely to be worn in the middle of the large curve and reduce costs of raw materials of the wear resistant layer, an inner-layer heterogeneous wear resistant combined elbow 2 is provided in the present invention that consists of an inner layer wear resistant large curve part 2-1 provided with an inner layer wear resistant large curve part outer surface 2-4 on its outer surface and an inner layer wear resistant small curve part 2-2 provided with an inner layer wear resistant small curve part outer surface 2-5 on its outer surface; wherein the inner layer wear resistant large curve part 2-1 is designed to become thicker from either side A to the middle B and from either side C to the middle D, which guarantees high wear resistance of locations that are most likely to be worn in the middle of the large curve; wherein the inner layer wear resistant small curve part 2-2 is designed to be of uniform or non-uniform thickness, guaranteeing that the small curve has respective wear resistance; the inner-layer heterogeneous wear resistant combined elbow 2 is a combined tube of an inner layer wear resistant large curve part 2-1 and an inner layer wear resistant small curve part 2-2 made of two different wear resistant materials selected from high chromium cast iron, medium chromium cast iron, low chromium cast iron, wear resistant cast iron, ceramics, hard alloy, bearing steel, alloy steel, and high molecular material, and said heterogenous structures are of different materials which has the benefits that locations under small impact force do not need equal material, thereby saving raw materials cost in manufacturing; wherein the inner layer wear resistant large curve part 2-1 should use an inner layer wear resistant material with a wear resistant property better than that of the small curve 2-2.

In order to reduce machining difficulty of wear resistant elbow and realize active auto-fill function of the reserved filling reinforcement bay 3 in the intermediate region between the outer-layer protection elbow 1 and the inner-layer heterogeneous wear resistant combined elbow 2, there is provided a filling channel 2-3 in the present invention which is the reserved slit after installing the inner layer wear resistant large curve part 2-1 and the inner layer wear resistant small curve part 2-2. Since there is provided a filling channel 2-3, the inner layer wear resistant large curve part 2-1 does not contact the inner layer wear resistant small curve part 2-2 directly. Therefore, complete consistency of edge machining for the inner layer wear resistant large curve part 2-1 and the inner layer wear resistant small curve part 2-2 is not required, hence reducing the processing difficulty. The filling channel 2-3 communicates with the reserved filling reinforcement bay 3 directly.

In order to realize the function of convenient connection and installation of elbow, a wear resistant connecting flange 4 is provided in the present invention, which consists of a flange 4-1 and a wear resistant sheath 4-2 mounted inside the flange 4-1.

In order to extend the service life of the wear resistant connecting flange 4 and guarantee smooth connection with other components, a wear resistant sheath 4-2 is provided in the present invention; and there is a wear resistant sheath engagement chamfer 4-5 on the wear resistant sheath 4-2 outer circle.

The active auto-fill of the reserved filling reinforcement bay 3 in the intermediate region between said outer-layer protection elbow 1 and said inner-layer heterogeneous wear resistant combined elbow 2 is characterized in that, upon first use of the wear resistant elbow, concrete grout enters the reserved filling reinforcement bay 3 through the filling channel 2-3 such that the concrete grout fill in the filling channel 2-3 and the reserved filling reinforcement bay 3, and the outer-layer protection elbow 1 and the inner-layer heterogeneous wear resistant combined elbow 2 are fixed as a whole, thereby achieving the purpose of protecting the inner layer wear resistant combined elbow and reducing impact.

Said filling channel 2-3 is a reserved slit formed after installing the inner layer wear resistant large curve part 2-1 and the inner layer wear resistant small curve part with a width controlled within 0.8 mm.

Preferably, the filling channel 2-3 is chosen to be 0.5 mm.

Said reserved filling reinforcement bay 3 is formed by mounting the large curve outer protection elbow 1-1 around the inner layer wear resistant large curve part 2-1 and the small curve outer protection elbow 1-2 around the inner layer wear resistant small curve part 2-2 and is characterized by the maximum distance controlled within 5 mm.

Preferably, the maximum distance of the reserved filling reinforcement bay 3 is controlled between 1-3 mm.

Preferably, there are two wear resistant connecting flanges, each wear resistant connecting flange is arranged on one end of the auto-fill two-layer two-half wear resistant elbow.

Since the above technical solution is adopted, the present invention realizes its inventive object well. The auto-fill two-layer two-half wear resistant elbow of a concrete pump truck is a conveying connecting elbow structure for conveying fluid state materials in building industry, and is designed as a two-layer two-half unique structure including a protection layer and a wear resistant layer, wherein the protection layer protects the wear resistant layer from distortion or even damage by external collision and striking and distortion or even damage by impact by internal materials during transportation, installation and use of the elbow. The wall thickness of the wear resistant layer is distributed non-uniformly (becoming thicker from both ends A toward the center B, and becoming thicker from both ends C towards the center D) such that the middle parts that are likely to be worn severely or even worn through in use are thicker, thereby increasing the service life of the elbow. The wear resistant connecting flange is designed to facilitate connection and installation of the elbow with other equipments and the wear resistant sheath inside the wear resistant connecting flange guarantees wear resistance of the open end, prolongs the service life of the wear resistant connecting flange and enhances its leakproofness. The inner-layer heterogeneous wear resistant combined elbow may use wear resistant material such as high chromium cast iron, medium chromium cast iron, low chromium cast iron, wear resistant cast iron, ceramics, hard alloy, bearing steel, alloy steel, and high molecular material, said heterogenous means different materials with the benefits of saving raw materials costs in manufacturing since locations where surging forces are small do not need equal materials; the outer protection layer uses material such as low-alloyed steel or medium-low carbon steel, wherein the inner layer wear resistant small curve part adopts a wear resistant material with cost lower than that of the inner layer wear resistant large curve part, thereby realizing controllability of cost. Active auto-fill of the reserved filling reinforcement bay means that upon the first use of the wear resistant elbow, the concrete grout enters the reserved filling reinforcement bay through the filling channel to fill up the filling channel and the reserved filling reinforcement bay such that the outer-layer protection elbow and the inner-layer heterogeneous wear resistant combined elbow are fixed together as a whole and will not generate friction consumption with each other. This design can reduce the entire weight of the elbow by at least 10%, thereby achieving the purpose of cost reduction, material saving, resource saving, long service life, low price, folds of improvement of performance to price ratio; ease of volume production, stable and reliable quality and high safety performance.

Figure 1:
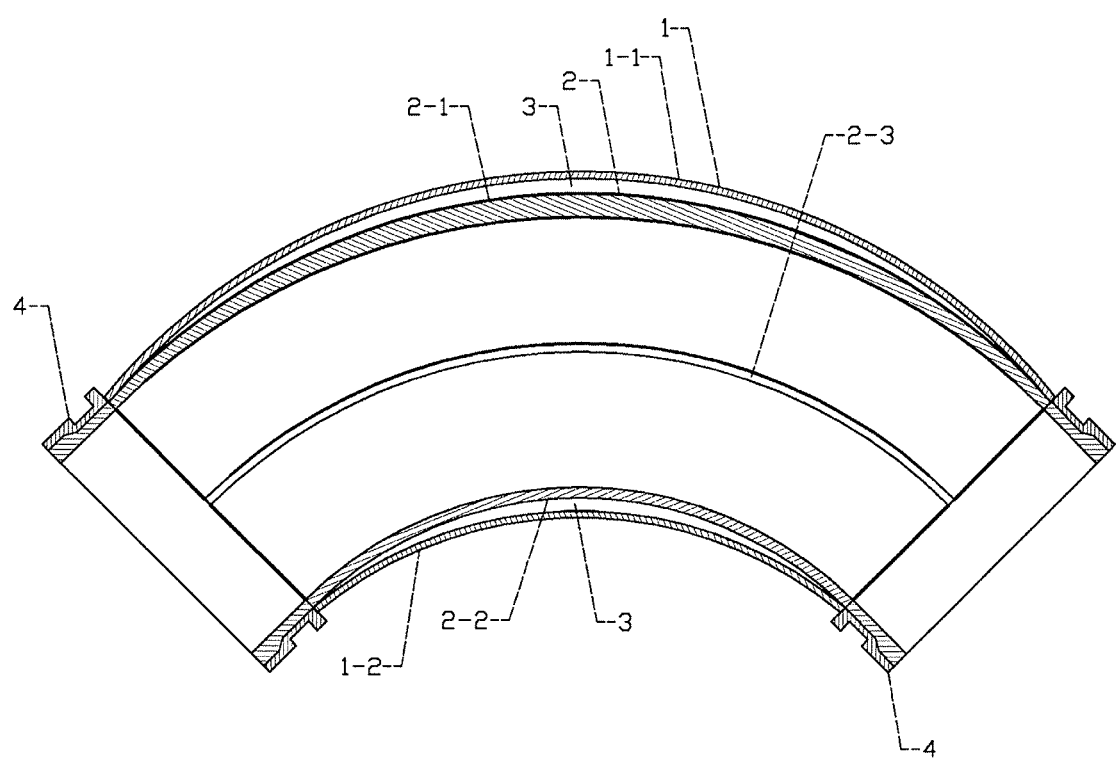
FIG. 1 is a schematic diagram of the sectional structure of the product of the invention.

Refer to the table on the last page of the specification for the explanation of reference numerals.

DETAILED DESCRIPTION OF EMBODIMENTS

The invention will be further described with reference to accompanying drawings.

Embodiments I

As can be known from the invention content, disclosed are an auto-fill two-layer two-half wear resistant elbow of concrete pump truck and a manufacturing method thereof. The elbow consists of an outer-layer protection elbow 1, an inner-layer heterogeneous wear resistant combined elbow 2 and a wear resistant connecting flange 4, and a reserved filling reinforcement bay 3 is provided between the outer-layer protection elbow 1 and the inner-layer heterogeneous wear resistant combined elbow 2, wherein the outer-layer protection elbow 1 consists of a large curve outer protection elbow 1-1 and a small curve outer protection elbow 1-2; the inner-layer heterogeneous wear resistant combined elbow 2 consists of an inner layer wear resistant large curve part 2-1 and an inner layer wear resistant small curve part 2-2, and the inner-layer wear resistant large curve 2-1 and the inner-layer wear resistant small curve 2-2 are of heterogenous design and form a cross section of closed loop. Upon pumping concrete for the first time, under the action of pressure, due to the different deformation rates between the inner layer wear resistant large curve part 2-1 and the inner layer wear resistant small curve part 2-2 with heterogenous design, the parts where they join each other separate and expand to form a filling channel 2-3 through which the concrete automatically fill the reserved filling reinforcement bay 3. While stopping pumping, the inner layer wear resistant large curve part 2-1 and the inner layer wear resistant small curve part 2-2 resume to close, and solidified concrete in the reserved filling reinforcement bay 3 may achieve the purpose that the outer-layer protection elbow 1 and the inner-layer heterogeneous wear resistant combined elbow 2 attach completely for reinforcing the elbow.

In the present invention, in order to protect the wear resistant layer on the inner layer of elbow from collision by external force, distortion and damage by striking and distortion or even damaged function by impact force of internal materials during the transportation, installation and use course of elbow, a large curve outer protection elbow 1-1 and a small curve outer protection elbow 1-2 are provided; a large curve outer protection elbow inner surface 1-3 is inside the large curve outer protection elbow 1-1, a small curve outer protection elbow inner surface 1-4 is inside the small curve outer protection elbow 1-2; wherein the cross sections of the large curve outer protection elbow 1-1 and the small curve outer protection elbow 1-2 are circular arcs of any degrees, while the combined cross section of two half-tubes may form a closed loop; and the outer-layer protection elbow 1 consists of a plurality of two halves or more components that combine to have a cross section that may form a closed loop.

Figure 2:
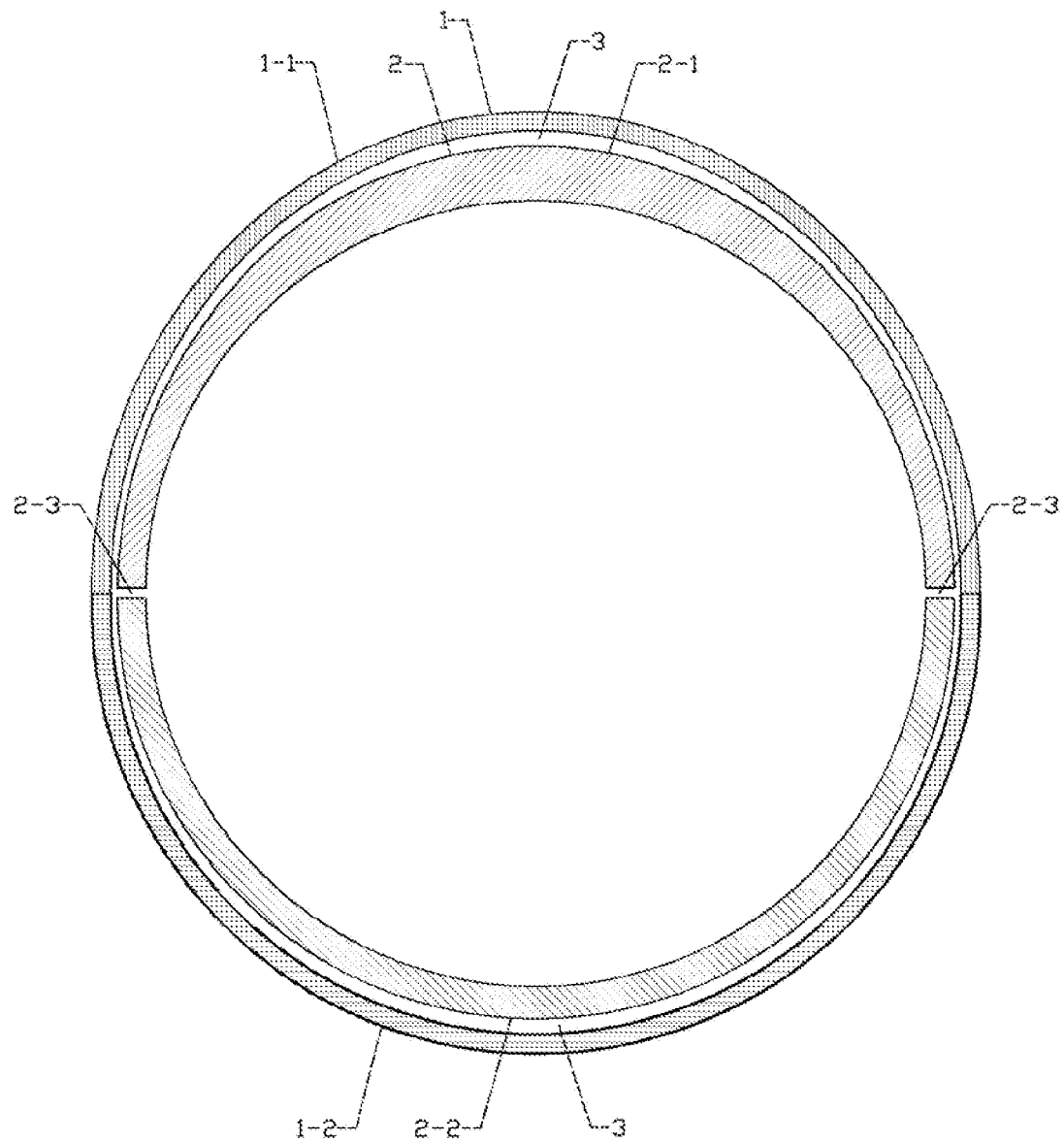
FIG. 2 is a schematic diagram of the sectional structure of the product of the invention.
Figure 3:
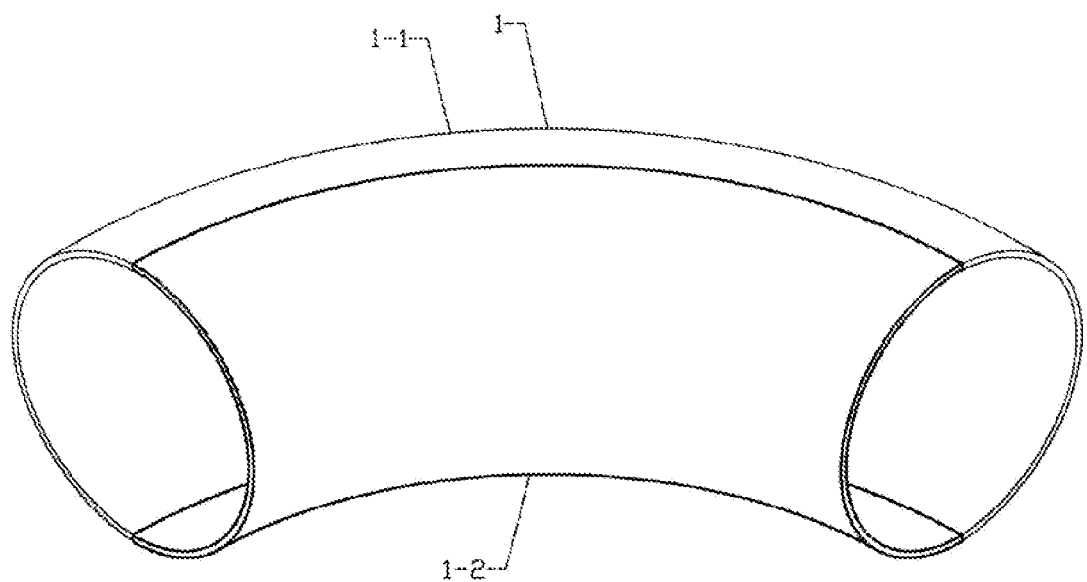
FIG. 3 is a structure diagram of mark 1 of the product of the present invention.
Figure 21:
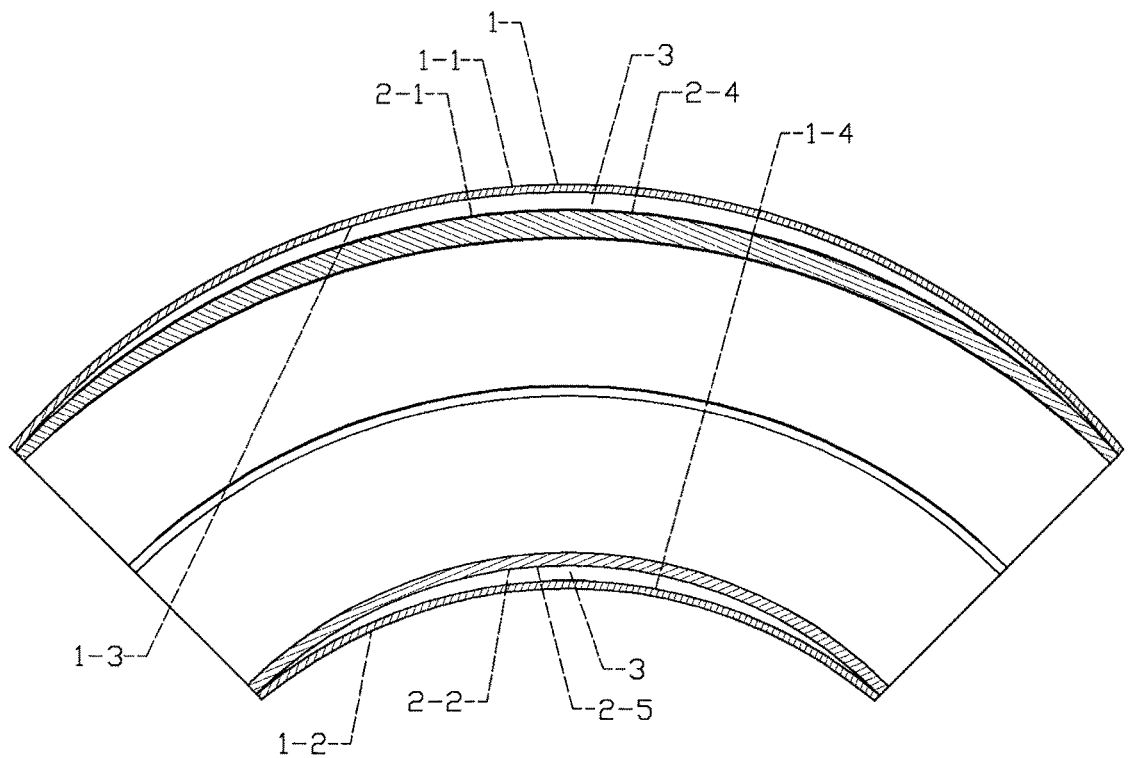
FIG. 21 is schematic diagrams of mark 1-1 of the product of the present invention after being mounted on 2-1 after preserving a filling reinforcement bay 3, and mark 1-2 after being mounted on 2-2 after preserving the filling reinforcement bay 3.
Figure 22:
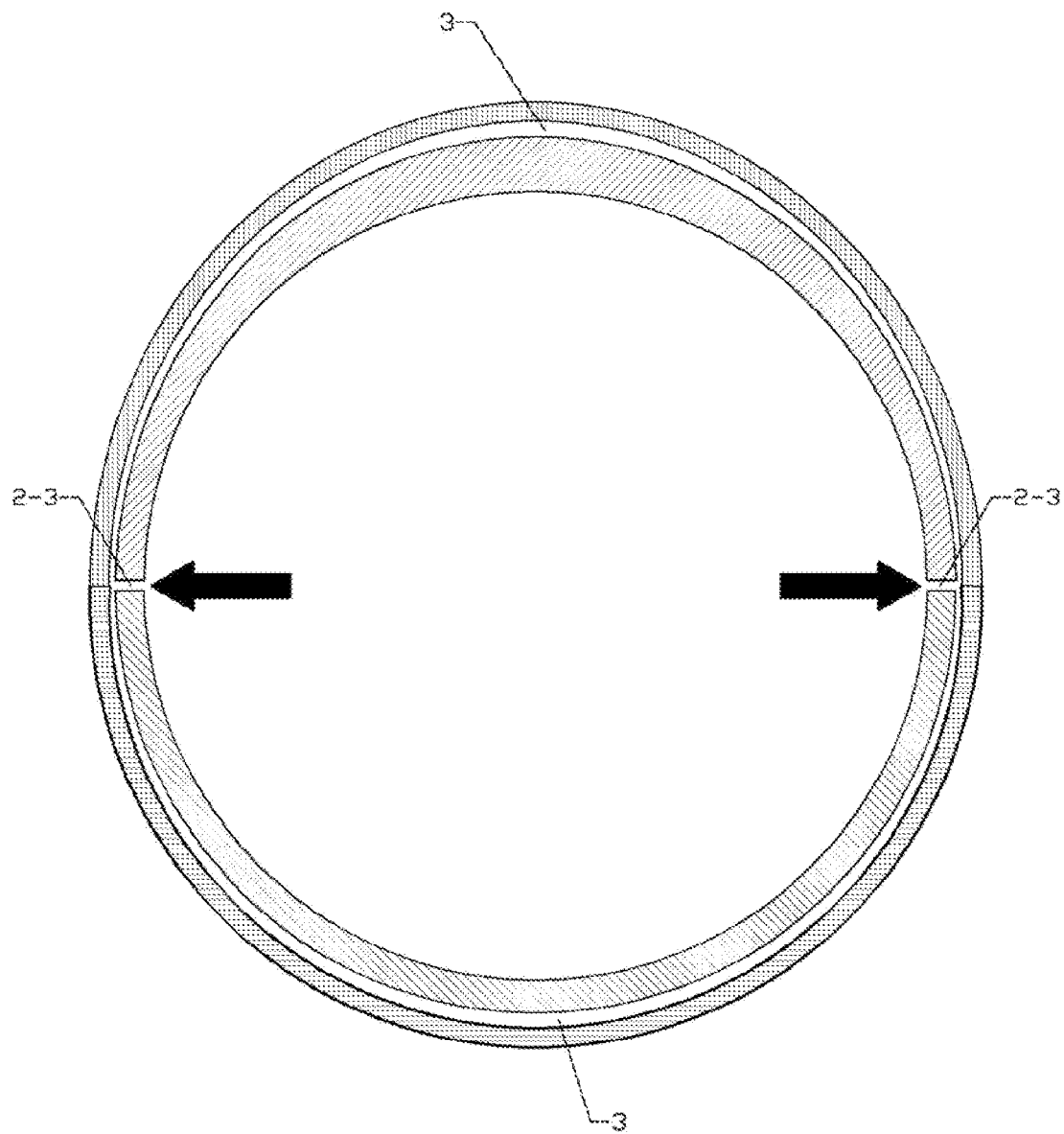
FIG. 22 is a schematic diagram of concrete flow direction for the first use of the present invention.

The outer-layer protection elbow 1 described in the present invention refers to an outer protection elbow for a wear resistant elbow, which is an elbow made of material such as low-alloyed steel or medium-low-carbon-alloyed steel for protecting the inner-layer heterogeneous wear resistant combined elbow 2 in the inner layer. It consists of a large curve outer protection elbow 1-1 and a small curve outer protection elbow 1-2. It functions to protect the wear resistant layer on the inner layer of elbow from collision by external force, distortion and damage by striking and distortion or even damage by impact force of internal materials during the transportation, installation and use course of elbow. Its structure is shown in FIG. 3 and its design location is shown in FIGS. 1, 2 and 21 by the reference numeral 1.

The large curve outer protection elbow 1-1 described in the present invention refers to an elbow made of material such as low-alloyed steel or medium-low carbon steel on which a large curve outer protection elbow inner surface 1-3 is disposed for protecting the wear resistant layer on the inner layer of elbow from collision by external force, distortion and damage by striking and distortion or even damage by impact force of internal materials during the transportation, installation and use course of elbow. Its structure is shown in FIGS. 4 and 5 and its design location is shown in FIGS. 1, 2, 3 and 21 by the reference numeral 1-1.

The small curve outer protection elbow 1-2 described in the present invention refers to an elbow made of material such as low-alloyed steel or medium-low carbon steel on which a small curve outer protection elbow inner surface 1-4 is disposed for protecting the wear resistant layer on the inner layer of elbow from collision by external force, distortion and damage by striking and distortion or even damage by impact force of internal materials during the transportation, installation and use course of elbow. Its structure is shown in FIGS. 6 and 7 and its design location is shown in FIGS. 1, 2, 3 and 21 by the reference numeral 1-2.

Figure 4:
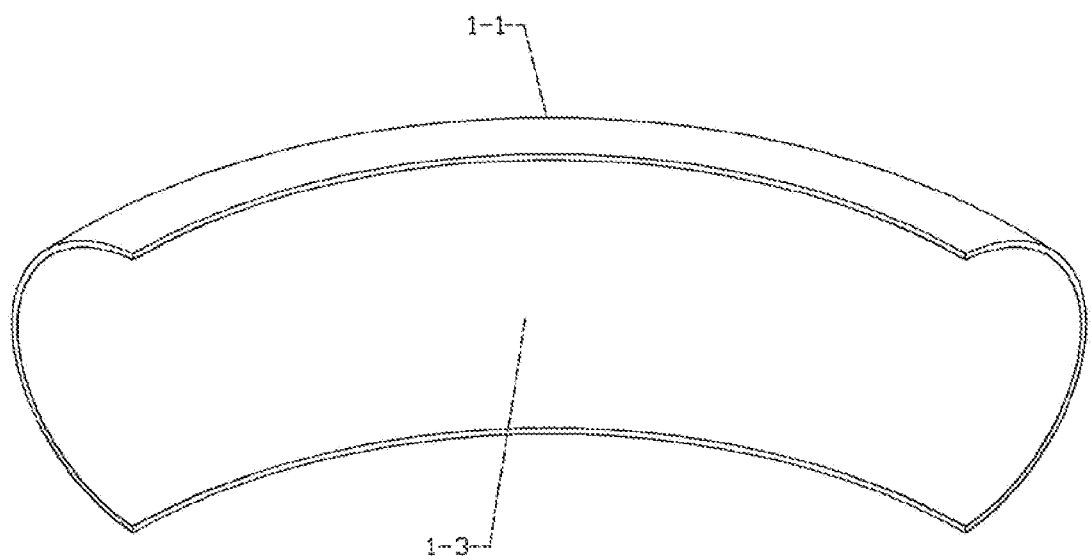
FIG. 4 is a structure diagram of mark 1-1 of the product of the present invention.
Figure 5:
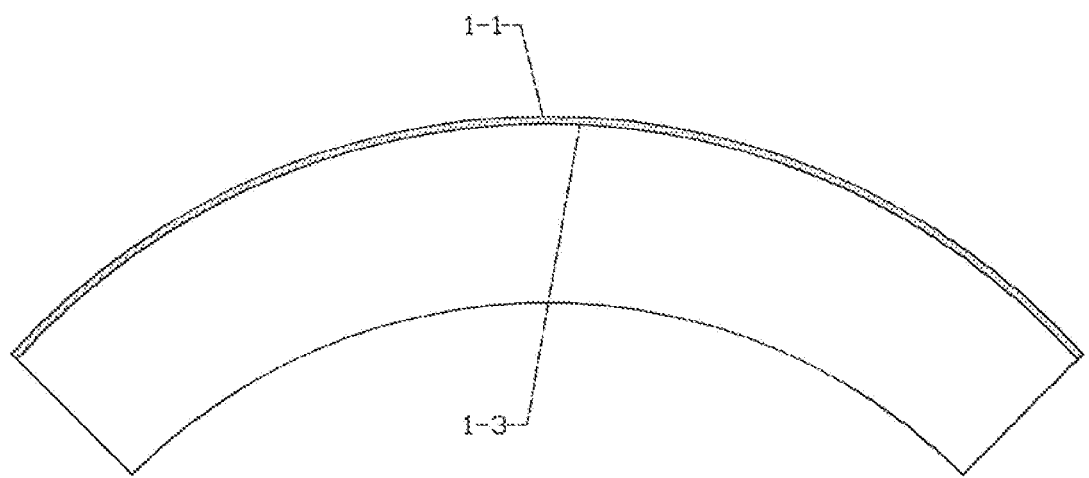
FIG. 5 is a sectional structure diagram of mark 1-1 of the product of the present invention.

The large curve outer protection elbow inner surface 1-3 described in the present invention refers to the inner surface of the large curver outer protection elbow 1-1 with its design location as shown in FIGS. 4 and 5 by the reference numeral 1-3.

Figure 6:
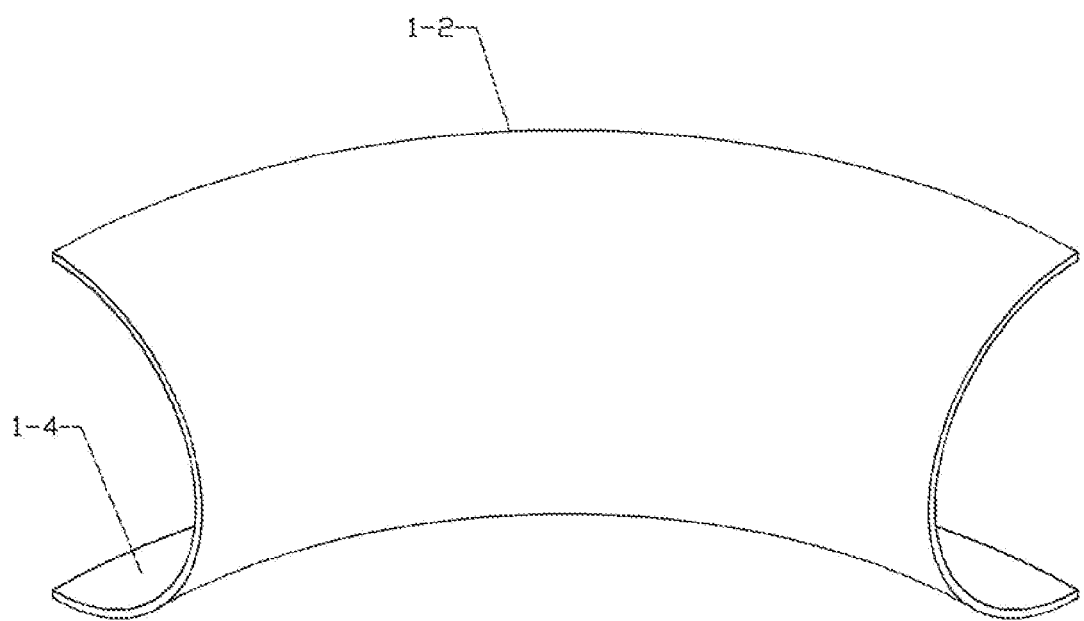
FIG. 6 is a structure diagram of mark 1-2 of the product of the present invention.
Figure 7:
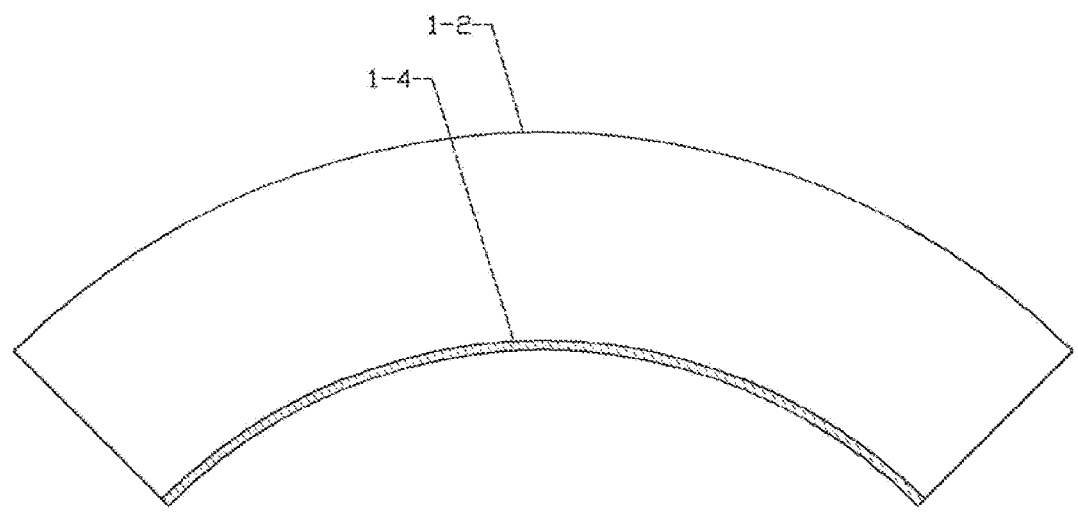
FIG. 7 is a sectional structure diagram of mark 1-2 of the product of the present invention.

The small curve outer protection elbow inner surface 1-4 described in the present invention refers to the inner surface of the small curver outer protection elbow 1-2 with its design location as shown in FIGS. 6 and 7 by the reference numeral 1-4.

Figure 8:
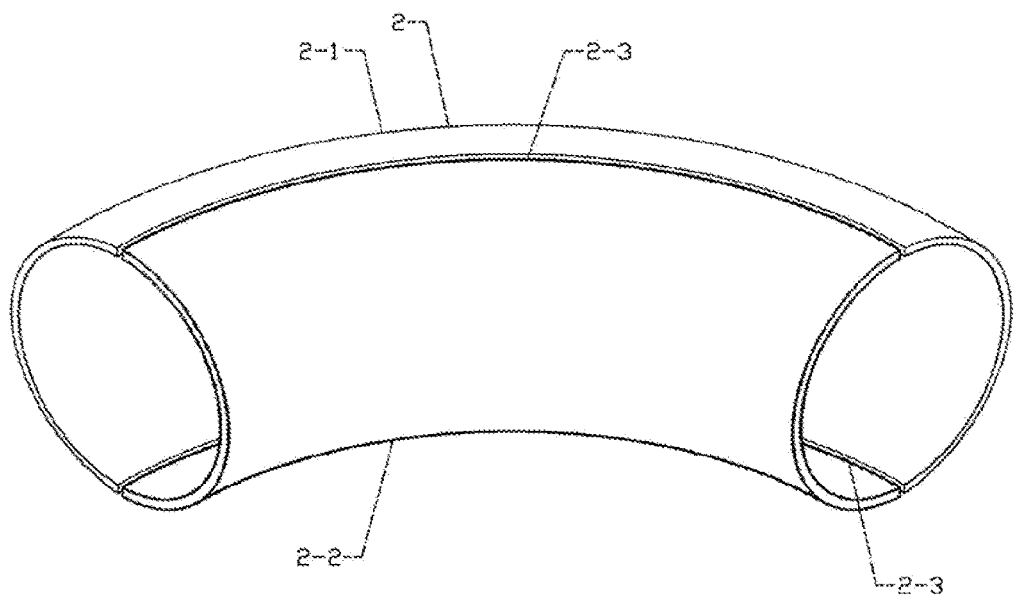
FIG. 8 is a structure diagram of mark 2 of the product of the present invention.

The inner-layer heterogeneous wear resistant combined elbow 2 described in the present invention refers to the combined inner wear resistant elbow of the wear resistant elbow with material of wear resistant material such as high chromium cast iron, medium chromium cast iron, low chromium cast iron, wear resistant cast iron, ceramics, hard alloy, bearing steel, alloy steel, high molecular material, which consists of an inner layer wear resistant large curve part 2-1 and an inner layer wear resistant small curve part 2-2 and functions to enhance wear resistance at locations that are most likely to be worn in the middle of the large curve and reduce raw material costs of the wear resistant layer. Its structure is shown in FIG. 8 and its design location is shown in FIGS. 1, 2 and 21 by the reference numeral 2.

Figure 9:
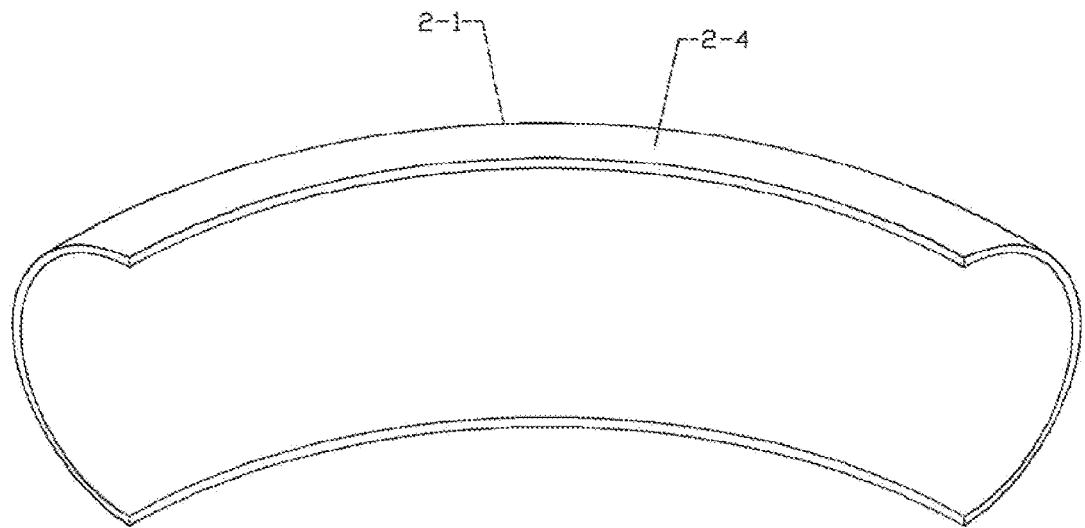
FIG. 9 is a structure diagram of mark 2-1 of the product of the present invention.
Figure 10:
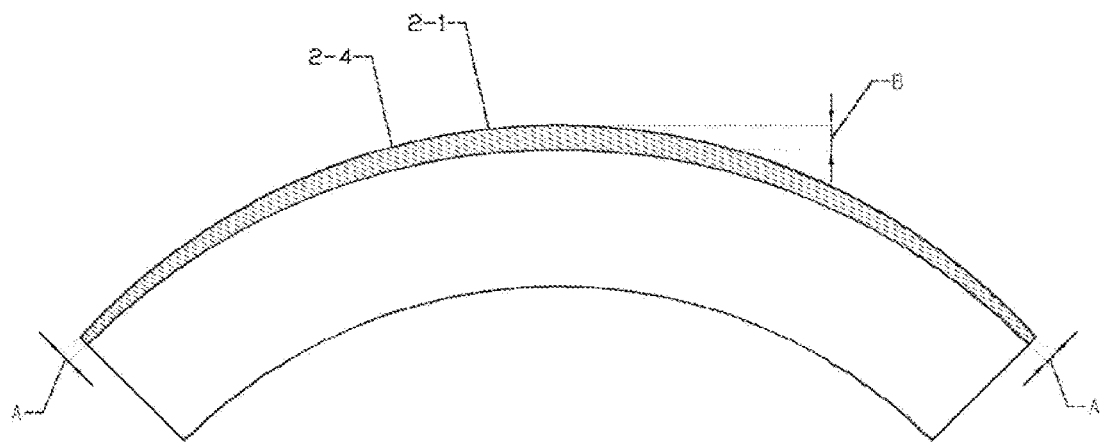
FIG. 10 is a sectional structure diagram of mark 2-1 of the product of the present invention.
Figure 11:
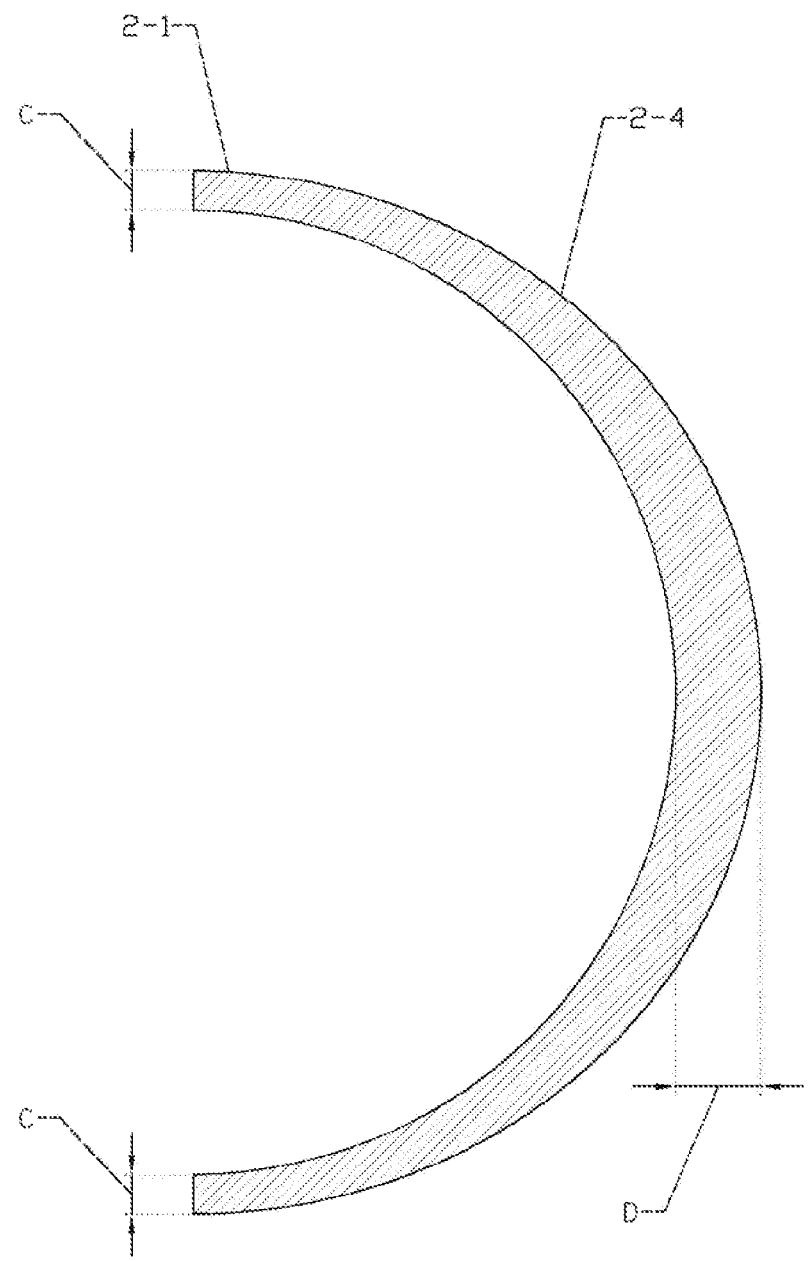
FIG. 11 is a sectional structure diagram of mark 2-1 of the product of the present invention.

The inner layer wear resistant large curve part 2-1 described in the present invention refers to a wear resistant elbow made of one of high chromium cast iron, low chromium cast iron, medium chromium cast iron, wear resistant cast iron casting, alloy steel, bearing steel forging, ceramics, hard alloy sintering, high molecular material syntheses, on which an inner layer wear resistant large curve part outer surface 2-4 is disposed and which functions to enhance wear resistance of locations that are likely to be worn in the middle of the large curve. Its structure is shown in FIGS. 9, 10 and 11 and its design location is shown in FIGS. 1, 2, 8 and 21 by the reference numeral 2-1.

Figure 12:
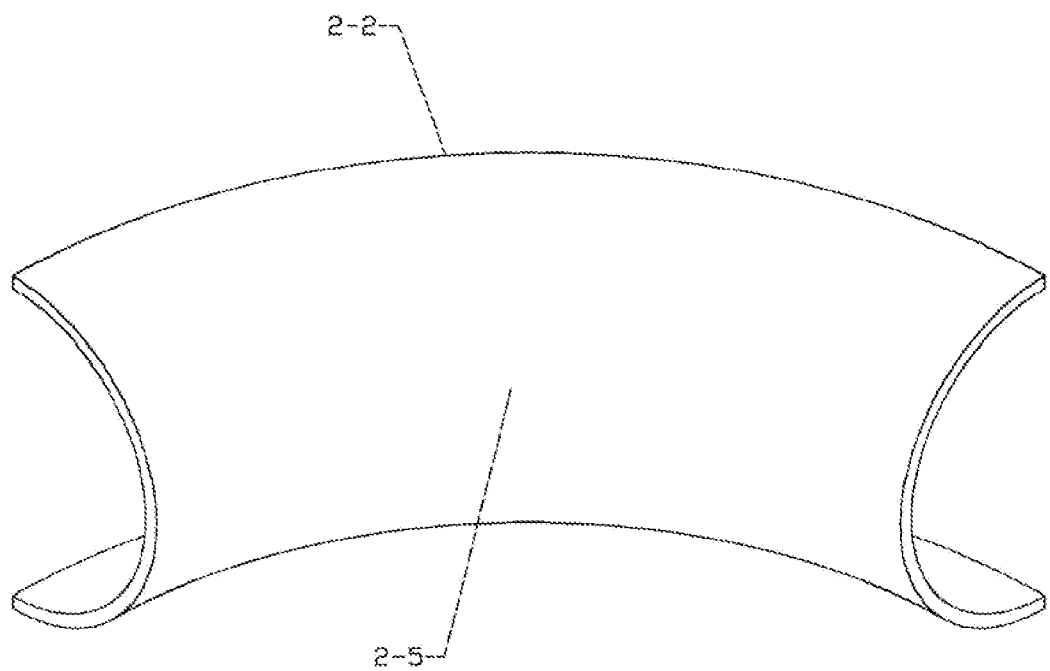
FIG. 12 is a structure diagram of mark 2-2 of the product of the present invention.
Figure 13:
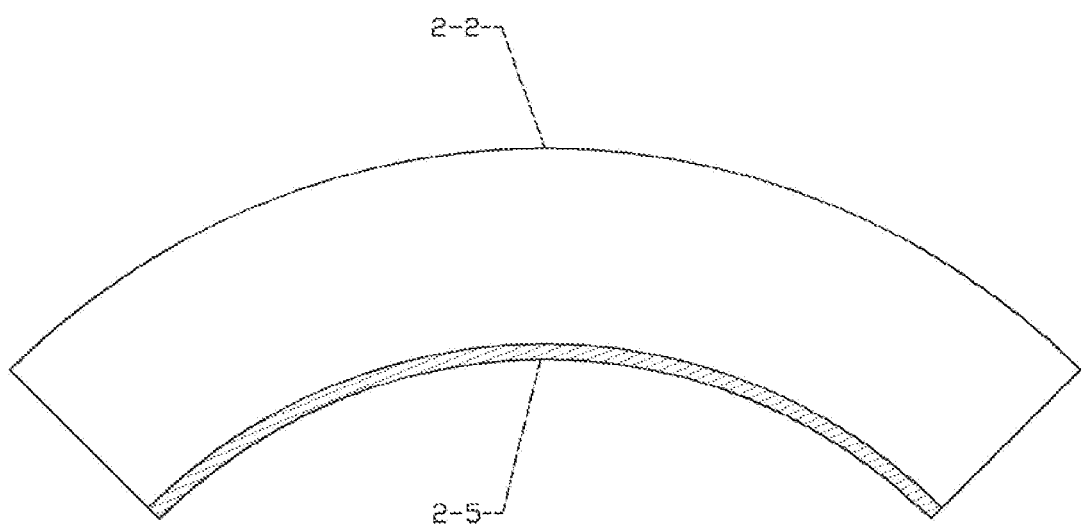
FIG. 13 is a sectional structure diagram of mark 2-2 of the product of the present invention.

The inner layer wear resistant small curve part 2-2 described in the present invention refers to a wear resistant elbow made of one of high chromium cast iron, low chromium cast iron, medium chromium cast iron, wear resistant cast iron casting, alloy steel, bearing steel forging, ceramics, hard alloy sintering, high molecular material syntheses, on which an inner layer wear resistant small curve part outer surface 2-5 is disposed and which functions to endow the small curve with wear resistance too. Its structure is shown in FIGS. 12 and 13 and its design location is shown in FIGS. 1, 2, 8 and 21 by the reference numeral 2-2.

The reserved filling reinforcement bay 3 described in the present invention refers to a reserved slit formed after installing the large curve outer protection elbow 1-1 and the inner layer wear resistant large curve part 2-1, as well as the small curve outer protection elbow 1-2 and the inner layer wear resistant small curve part 2-2, with its design location shown in FIGS. 1, 2 and 21 by the reference numeral 3.

Figure 14:
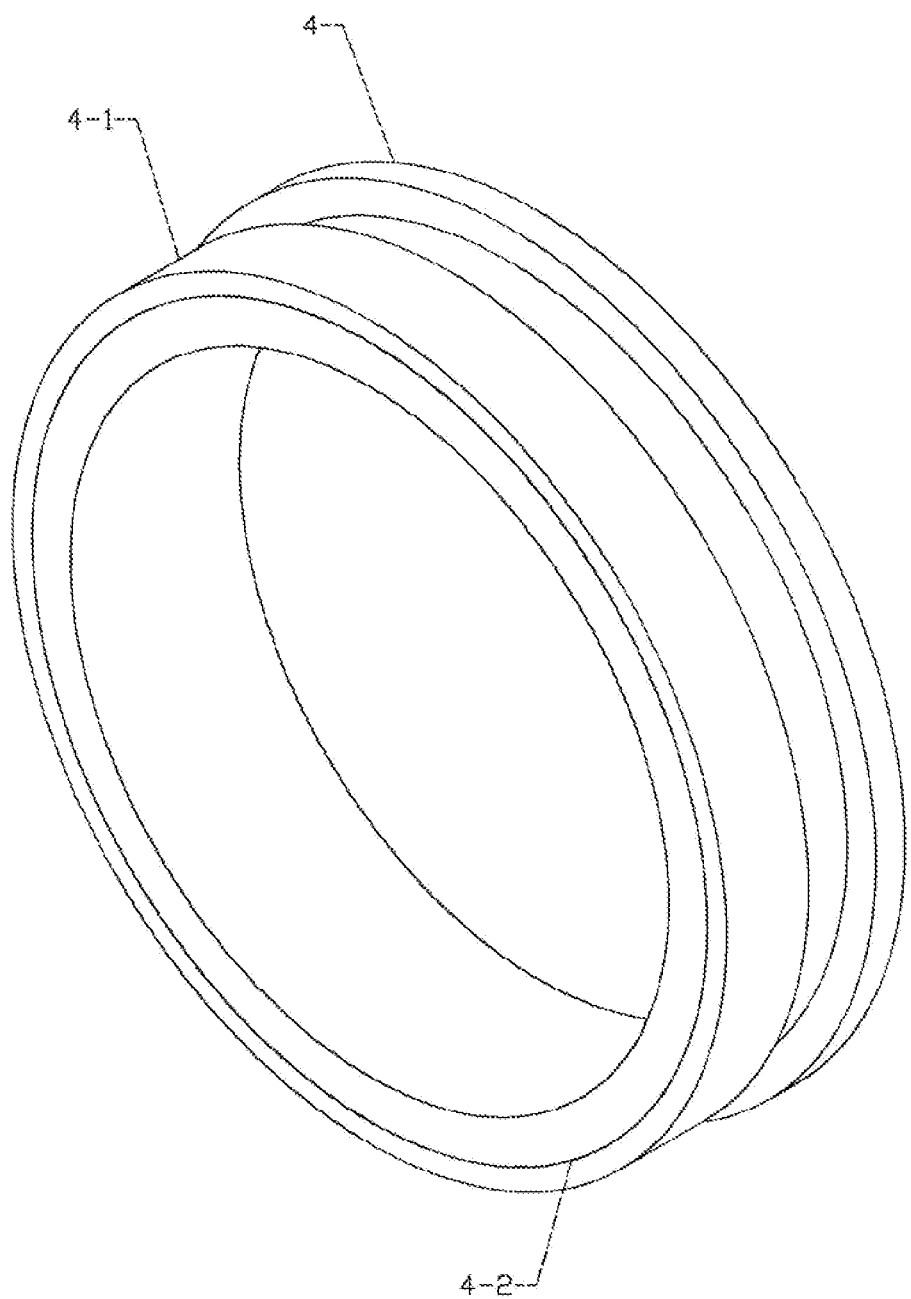
FIG. 14 is a structure diagram of mark 4 of the product of the present invention.
Figure 15:
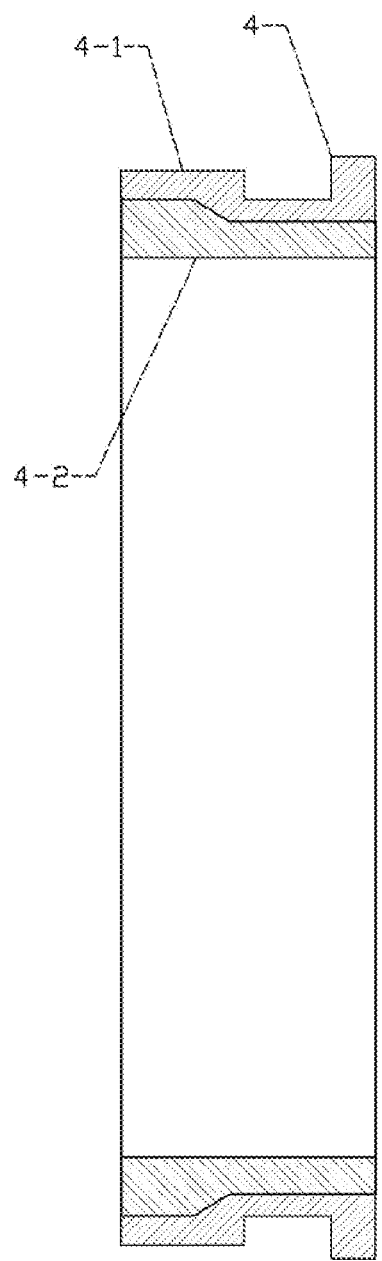
FIG. 15 is a sectional structure diagram of mark 4 of the product of the present invention.

The wear resistant connecting flanges 4 described in the present invention refer to connecting flanges mounted on both ends of the outer-layer protection elbow 1 which consist of a flange 4-1 and a wear resistant sheath 4-2 and function to facilitate connection and installation of elbow and ensure wear resistance of open ends. Their structure are shown in FIGS. 14 and 15, and their design locations are shown in FIG. 1 by the reference numeral 4.

Embodiment II

As can be known from the invention content, in order to enhance wear resistance of locations that are most likely to be worn in the middle of the large curve and reduce costs of raw materials of the wear resistant layer, an inner-layer heterogeneous wear resistant combined elbow 2 is provided in the present invention that consists of an inner layer wear resistant large curve part 2-1 provided with an inner layer wear resistant large curve outer surface 2-4 outside it and an inner layer wear resistant small curve part 2-2 provided with an inner layer wear resistant small curve outer surface 2-5 outside it; wherein the inner layer wear resistant large curve part 2-1 is designed to become thicker from either side A to the middle B and from either side C to the middle D, which guarantees high wear resistance of locations that are most likely to be worn in the middle of the large curve; wherein the inner layer wear resistant small curve part 2-2 is designed to be of uniform or non-uniform thickness, guaranteeing that the small curve has respective wear resistance; the inner-layer heterogeneous wear resistant combined elbow 2 is a combined tube of an inner layer wear resistant large curve part 2-1 and an inner layer wear resistant small curve part 2-2 made of two different wear resistant materials selected from high chromium cast iron, medium chromium cast iron, low chromium cast iron, wear resistant cast iron, ceramics, hard alloy, bearing steel, alloy steel, and high molecular material, and said heterogenous structures are of different materials which has the benefits that locations under small impact force do not need equal material, thereby saving raw materials cost in manufacturing; wherein the inner layer wear resistant large curve part 2-1 should use an inner layer wear resistant material with a wear resistant property better than that of the small curve 2-2.

The inner layer wear resistant large curve part outer circular surface 2-4 described in the present invention refers to an engaged surface on the outer circular surface of the inner layer wear resistant large curve part 2-1 with its design location as shown in FIGS. 9, 10 and 11 by reference numeral 2-4.

The inner layer wear resistant small curve part outer circular surface 2-5 described in the present invention refers to an engaged surface on the outer circular surface of the inner layer wear resistant small curve part 2-2 with its design location as shown in FIGS. 12 and 13 by reference numeral 2-5.

Embodiments III

As can be known from the invention content, in order to reduce machining difficulty of wear resistant elbow and realize active auto-fill function of the reserved filling reinforcement bay 3 in the intermediate region between the outer-layer protection elbow 1 and the inner-layer heterogeneous wear resistant combined elbow 2, there is provided a filling channel 2-3 in the present invention which is the reserved slit after installing the inner layer wear resistant large curve part 2-1 and the inner layer wear resistant small curve part 2-2. Since there is provided a filling channel 2-3, the inner layer wear resistant large curve part 2-1 does not contact the inner layer wear resistant small curve part 2-2 directly. Therefore, complete consistency of edge machining for the inner layer wear resistant large curve part 2-1 and the inner layer wear resistant small curve part 2-2 is not required, hence reducing the processing difficulty. The filling channel 2-3 communicates with the reserved filling reinforcement bay 3 directly.

The filling channel 2-3 described in the present invention refers to a reserved slit formed after installing the inner layer wear resistant large curve part 2-1 and the inner layer wear resistant small curve part 2-2 which functions to reduce machining difficulty of the wear resistant elbow and realizes active auto-fill of the reserved filling reinforcement bay 3 in the intermediate region between the outer-layer protection elbow 1 and the inner-layer heterogeneous wear resistant combined elbow 2. Its design location is shown in FIGS. 1, 2, 8 and 21 by the reference numeral 2-3.

Embodiments IV

As can be known from the invention content, in order to realize the function of facilitating connection and installation of elbow, a wear resistant connecting flange 4 is provided in the present invention, which consists of a flange 4-1 and a wear resistant sheath 4-2 mounted inside the flange 4-1.

In order to extend the service life of the wear resistant connecting flange 4 and guarantee smooth connection with other components, a wear resistant sheath 4-2 is provided in the present invention; and a wear resistant sheath engagement chamfer 4-5 is provided on the wear resistant sheath 4-2 outer circle.

Figure 16:
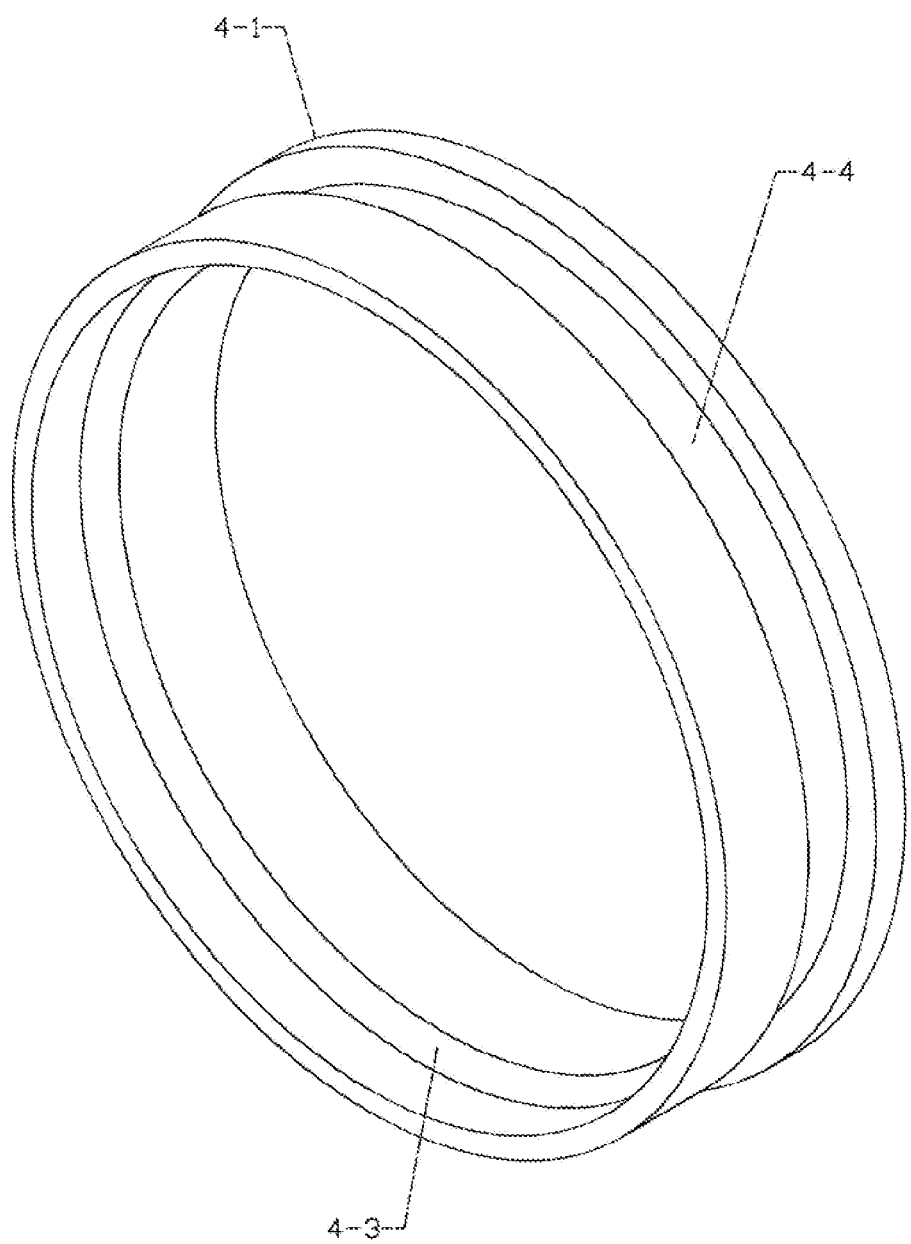
FIG. 16 is a structure diagram of mark 4-1 of the product of the present invention.
Figure 17:
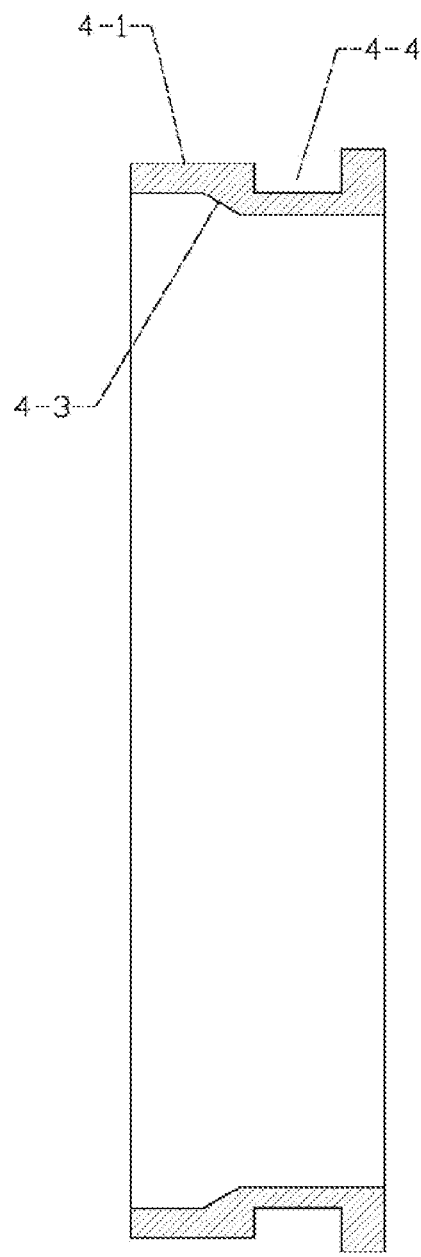
FIG. 17 is a sectional structure diagram of mark 4-1 of the product of the present invention.

The flange 4-1 described in the present invention refers to an building block of the wear resistant connecting flange 4 on which a flange engagement chamfer 4-3 and a connection slot 4-4 are provided and which functions to facilitate connection and installation of the elbow with other equipments. Its structure is shown in FIGS. 16 and 17 and its design location is shown in FIGS. 14 and 15 by the reference numeral 4-1.

Figure 18:
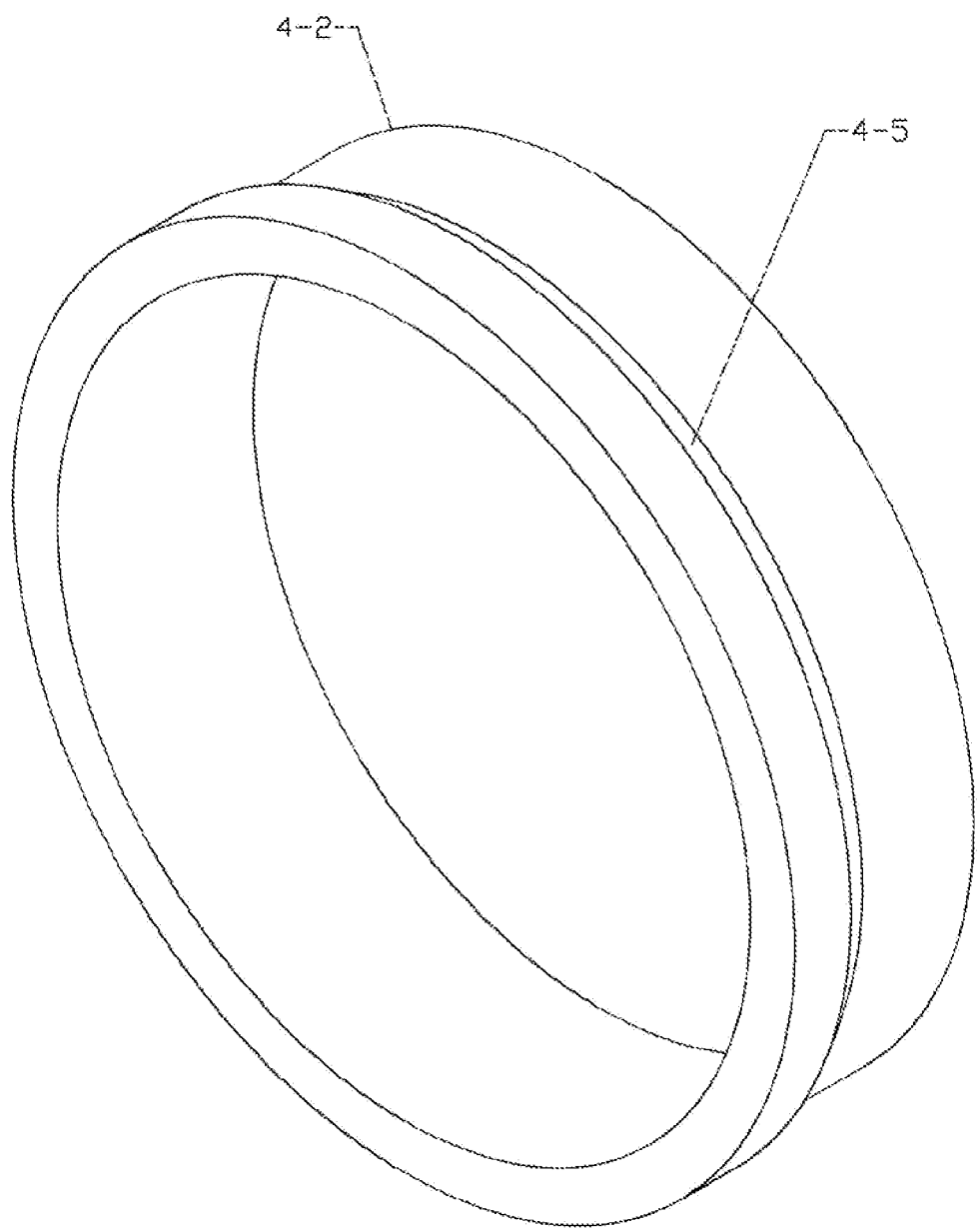
FIG. 18 is a structure diagram of mark 4-2 of the product of the present invention.
Figure 19:
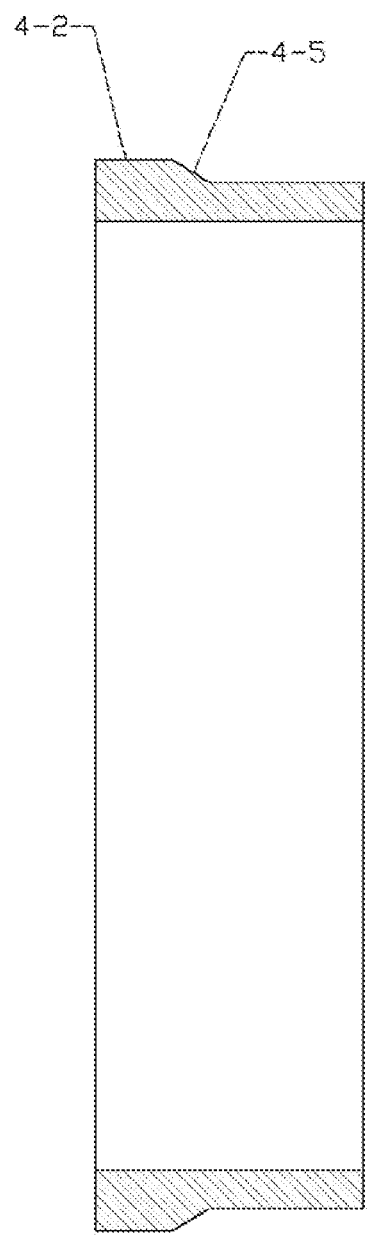
FIG. 19 is a sectional structure diagram of mark 4-2 of the product of the present invention.
Figure 20:
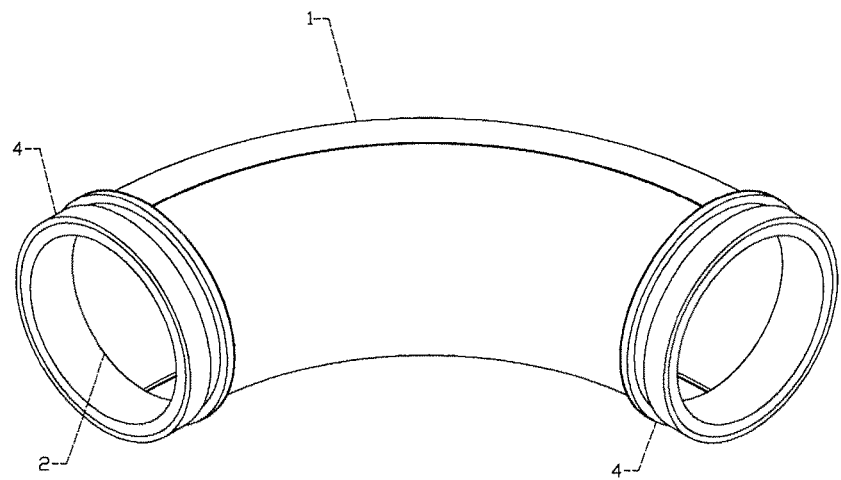
FIG. 20 is a entire structure diagram of marks of the product of the present invention.

The wear resistant sheath 4-2 described in the present invention refers to a wear resistant sheath made of one of high chromium cast iron, low chromium cast iron, medium chromium cast iron, wear resistant cast iron casting, alloy steel, bearing steel forging, ceramics, hard alloy sintering, and high molecular material on which a wear resistant sheath engagement chamfer 4-5 is provided and which functions to extend the service life of wear resistant connecting flange 4 and enhance leakage prevention. Its structure is shown in FIGS. 18 and 19, and its design location is shown in FIGS. 14, 15 by the reference numeral 4-5.

The flange engagement chamfer 4-3 described in the present invention refers to an engagement chamfer disposed inside the flange 4-1 which functions to facilitate installation of flange 4-1 and wear resistant sheath 4-2. Its design location is shown in FIGS. 16 and 17 by the reference numeral 4-3.

The connection slot 4-4 described in the present invention refers to a slot disposed on the flange 4-1 outer circle which functions to facilitate installation of flange 4-1 and other equipments. Its design location is shown in FIGS. 16 and 17 by the reference numeral 4-4.

The flange engagement chamfer 4-5 described in the present invention refers to an engagement chamfer disposed on the flange 4-2 outer circle which functions to facilitate installation of flange 4-1 and wear resistant sheath 4-2. Its design location is shown in FIGS. 18 and 19 by the reference numeral 4-5.

Embodiment V

As can be known from the invention content, the active auto-fill of the reserved filling reinforcement bay 3 in the intermediate region between said outer-layer protection elbow 1 and said inner-layer heterogeneous wear resistant combined elbow 2 is characterized in that, upon first use of the wear resistant elbow, concrete grout enters the reserved filling reinforcement bay 3 through the filling channel 2-3 such that the concrete grout fill in the filling channel 2-3 and the reserved filling reinforcement bay 3, and the outer-layer protection elbow 1 and the inner-layer heterogeneous wear resistant combined elbow 2 are fixed as a whole for which no friction consumption will be generated.

Said filling channel 2-3 is a reserved slit formed after installing the inner layer wear resistant large curve part 2-1 and the inner layer wear resistant small curve part with a width controlled within 0.8 mm.

Said reserved filling reinforcement bay 3 is formed by mounting the large curve outer protection elbow 1-1 around the inner layer wear resistant large curve part 2-1 and the small curve outer protection elbow 1-2 around the inner layer wear resistant small curve part 2-2 and is characterized by the maximum distance controlled between 1-5 mm.

Preferably, the filling channel 2-3 is chosen to be 0.5 mm.

Preferably, the maximum distance of the reserved filling reinforcement bay 3 is controlled between 1-3 mm.

Embodiment VI

As can be known from the invention content, the material selected for the building block of the inner-layer heterogeneous wear resistant combined elbow 2, namely the inner layer wear resistant large curve part 2-1 and the inner layer wear resistant small curve part 2-2 is one of high chromium cast iron, low chromium cast iron, medium chromium cast iron, wear resistant cast iron casting, alloy steel, bearing steel forging, ceramics, hard alloy sintering, high molecular material, and materials of different wear resistance performance are selected for the inner layer wear resistant large curve part 2-1 and the inner layer wear resistant small curve part 2-2.

$$2HRC \leq HRC_{(2-1)} - HRC_{(2-2)} \leq 10HRC \quad (1)$$

$$\Delta_{(2-2)}/\Delta_{(2-1)} = 2\sim6 \text{ (preferably } 2\sim3\text{)} \quad (2)$$

$\Delta$ Represents the wear consumption amount under the same working condition circumstance, the same time and the same sample, and the wear consumption amount $\Delta m_{prior\text{-}wear} - m_{post\text{-}wear}$.

HRC is the hardness value of the material as measured by a Rockwell hardometer.

Experimental Results

The wear resistant elbow obtained from the present application is subjected to performance test and cost comparison, and the resulting data is shown in the following table.

| No. | Inner layer wear resistant large curve part 2-1/inner layer wear resistant small curve part 2-2 | Service life (ten thousand of cubic meters of concrete) | Cost (Yuan) |
|---|---|---|---|
| 1 | High chromium cast iron/bearing steel | 5--8 | 250--300 |
| 2 | Ceramics/bearing steel | 6--10 | 400--600 |

Taking the material No. 1 as an example, for the elbow without the filling bay, with material ingredient and thicknesses unchanged, the cost of manufacture is increased by 10-15%.

If the inner layer wear resistant large curve part and the inner layer wear resistant small curve part both use the same material with high wear resistance, service life is equivalent to the wear resistant elbow obtained from the present application and cost is increase. If the cost is guaranteed to be equivalent, then the service life is reduced.

If both the inner layer wear resistant large curve part and the inner layer wear resistant small curve part use the same material with poor wear resistance, service life is reduce as compared with the wear resistant elbow obtained from the present application.

It is evident that it is possible to modify and/or add components for the above-mentioned wear resistant elbow and the corresponding method for pumping concrete without departing from the spirit and scope of the present invention.

It is also understood that although the present invention has been described with reference to some specific examples, those skilled in the art can certainly obtain many other equivalent forms of elbows and corresponding methods for pumping concrete with the features as described in claims, which therefore are within the protection scope defined thereby.

| Reference numeral | Referance name |
|---|---|
| 1 | Outer-layer protection elbow 1 |
| 1-1 | Large curve outer protection elbow 1-1 |
| 1-2 | Small curve outer protection elbow 1-2 |
| 1-3 | Large curve outer protection elbow inner circlular surface 1-3 |
| 1-4 | Small curve outer protection elbow inner circlular surface 1-4 |
| 2 | Inner-layer heterogeneous wear resistant combined elbow 2 |
| 2-1 | Inner layer wear resistant large curve part 2-1 |
| 2-2 | Inner layer wear resistant small curve part 2-2 |
| 2-3 | Filling channel 2-3 |
| 2-4 | Inner layer wear resistant large curve part outer circular surface 2-4 |
| 2-5 | Inner layer wear resistant small curve part outer circular surface 2-5 |
| 3 | Reserved filling reinforcement bay 3 |
| 4 | Wear resistant connecting flange 4 |
| 4-1 | Flange 4-1 |
| 4-2 | Wear resistant sheath 4-2 |
| 4-3 | Flange engagement chamfer 4-3 |
| 4-4 | Connecting slot 4-4 |
| 4-5 | Wear resistant engagement chamfer 4-5 |

The invention claimed is:

1. An auto-fill two-layer two-half wear resistant elbow of a concrete pump truck, comprising:
    an outer-layer protection elbow;
    an inner-layer heterogeneous wear resistant combined elbow; and
    a first wear resistant connecting flange,
    wherein said inner-layer heterogeneous wear resistant combined elbow comprises:
    an inner layer wear resistant large curve part and an inner layer wear resistant small curve part, each having a first longitudinal edge and a second longitudinal edge, which are made of different materials, wherein the inner layer wear resistant large curve part is made of a wear resistant material with a wear resistance performance better than a wear resistance performance of the inner layer wear resistant small curve part,
    a first longitudinal seam formed by the first longitudinal edge of the inner layer wear resistant large curve part and the first longitudinal edge of the inner layer wear resistant small curve part and a second longitudinal seam formed by the second longitudinal edge of the inner layer wear resistant large curve part and the second longitudinal edge of the inner layer wear resistant small curve part,
    the inner layer wear resistant large curve part and the inner layer wear resistant small curve part joined by the first wear resistant connecting flange thereby creating a filling channel at the first longitudinal seam and at the second longitudinal seam; and
    a reserved filling reinforcement bay is provided between the outer-layer protection elbow and the inner-layer heterogeneous wear resistant combined elbow,
    wherein the inner layer wear resistant large curve part is a first half of an elbow and the inner layer wear resistant small curve part is a second half of an elbow, and
    wherein the first longitudinal seam and the second longitudinal seam enable concrete to automatically fill the reserved filling reinforcement bay upon pumping of concrete.

2. The auto-fill two-layer two-half wear resistant elbow of a concrete pump truck of claim 1, further comprising a second wear resistant connecting flange, one of the wear resistant connecting flanges arranged on each end of the auto-fill two-layer two-half wear resistant elbow.

3. The auto-fill two-layer two-half wear resistant elbow of a concrete pump truck of claim 2, wherein the inner layer wear resistant large curve part is made of one of wear resistant cast iron, ceramics and hard alloy, and the inner layer wear resistant small curve part is made of one of alloy steel and high molecular material.

4. The auto-fill two-layer two-half wear resistant elbow of a concrete pump truck of claim 2, wherein each of the wear resistant connecting flanges comprises a flange and a wear resistant sheath mounted inside the flange.

5. The auto-fill two-layer two-half wear resistant elbow of a concrete pump truck of claim 1, wherein the outer-layer protection elbow is made of low-alloyed steel or medium-low carbon steel material.

6. The auto-fill two-layer two-half wear resistant elbow of a concrete pump truck of claim 1, wherein the inner layer wear resistant large curve part is made of one of wear resistant cast iron, ceramics and hard alloy, and the inner layer wear resistant small curve part is made of one of alloy steel and high molecular material.

7. The auto-fill two-layer two-half wear resistant elbow of a concrete pump truck of claim 1, wherein the first wear resistant connecting flange comprises a flange and a wear resistant sheath mounted inside the flange.

8. The auto-fill two-layer two-half wear resistant elbow of a concrete pump truck of claim 1, wherein a maximum distance of the reserved filling reinforcement bay is within 1-3 mm.

9. The auto-fill two-layer two-half wear resistant elbow of a concrete pump truck of claim 1, wherein a radius of curvature of the inner layer wear resistant large curve part is larger than a radius of the inner layer wear resistant small curve part.

10. The auto-fill two-layer two-half wear resistant elbow of a concrete pump truck of claim 1, wherein the inner-layer heterogeneous wear resistant combined elbow has two ends and a middle part between the two ends, and
    wherein a thickness at the middle part of the inner-layer heterogeneous wear resistant combined elbow is greater than a thickness of the ends of the inner-layer heterogeneous wear resistant combined elbow.

* * * * *